J. L. OPP.
ICE BREAKER.
APPLICATION FILED APR. 27, 1912.
1,034,286.
Patented July 30, 1912.
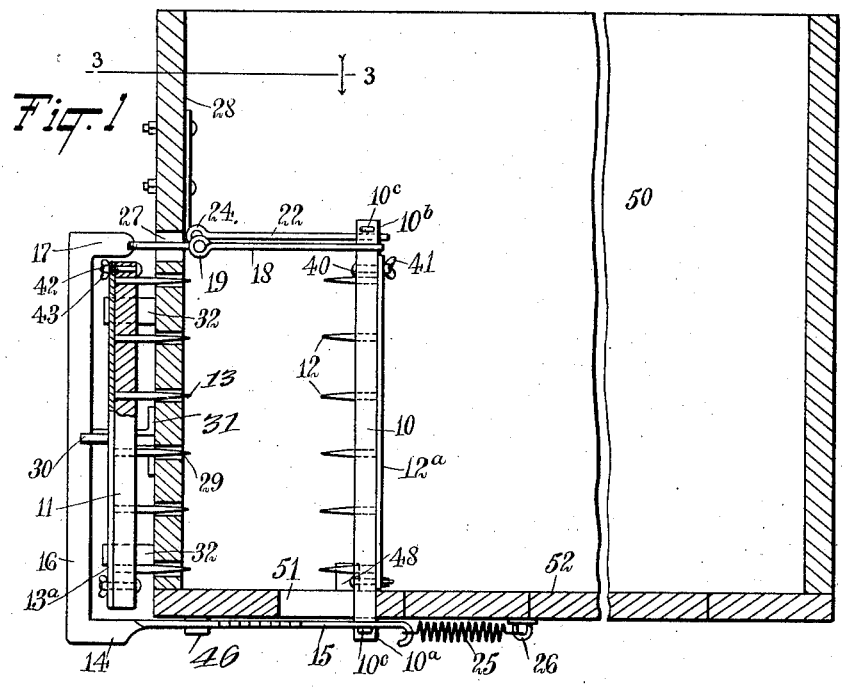
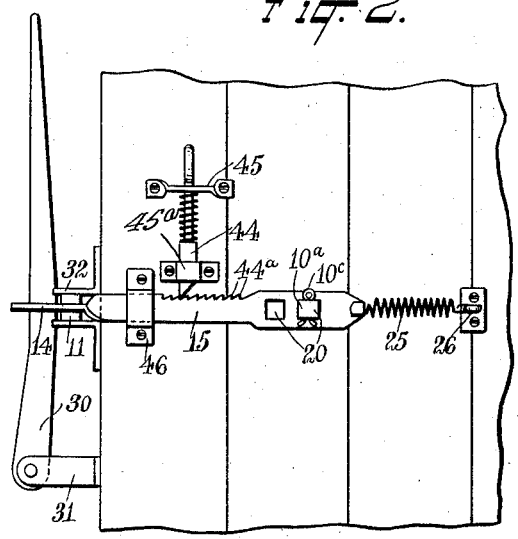
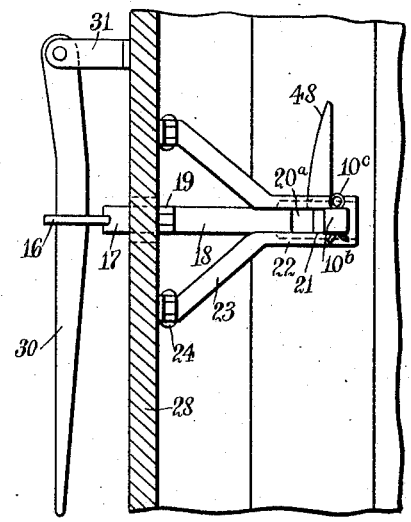
WITNESSES
George Bambay
J. L. McAuliffe
INVENTOR
James Luther Opp
BY Munn & Co
ATTORNEYS

UNITED STATES PATENT OFFICE.

JAMES LUTHER OPP, OF PINCKNEYVILLE, ILLINOIS.

ICE-BREAKER.

1,034,286.  Specification of Letters Patent.  Patented July 30, 1912.

Application filed April 27, 1912. Serial No. 693,751.

*To all whom it may concern:*

Be it known that I, JAMES LUTHER OPP, a citizen of the United States, and a resident of Pinckneyville, in the county of Perry and State of Illinois, have invented a new and Improved Ice-Breaker, of which the following is a full, clear, and exact description.

My invention relates to devices for breaking ice from a cake, so as to sever a piece of any desired size and cause the cake to split on a substantially straight line.

The invention is particularly adapted for embodiment in an attachment for ice wagons, but may be employed in connection with any suitable supporting frame at an ice plant, or the like.

The distinguishing features of my invention and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a partly sectional elevation of an ice breaker embodying my invention, the same being mounted on a wagon body which is partly shown in section; Fig. 2 is a bottom plan view; and Fig. 3 is a top plan view, the side of the wagon being in section, as indicated by the line 3—3 in Fig. 1.

The invention comprises substantially parallel vertical bars 10, 11, having teeth or picks 12, 13. Means are provided for moving the bars relatively to each other. In the form shown, there is a frame 14 comprising a bottom arm 15, an end bar 16, and an inwardly extending upper arm 17, the inner portion 18 of which upper arm is hinged as at 19. The inner toothed bar 10 within the wagon 50 has its lower end $10^a$ extending through a slot 51 in the bottom 52 of the wagon, and passing also through one of a plurality of openings 20 in the bottom member 15 of the frame 14. The upper end $10^b$ of the bar 10 moves in a guide slot 21 formed in a guide arm 22, the outer end of which is forked, as at 23 (Fig. 3), and preferably hinged, as at 24, to the inner side of the wagon body 50, or other suitable frame or support. The upper end $10^b$ of the bar 10 passes also through one of a plurality of holes $20^a$ in the hinged member 18 of the upper frame arm 17. The frame 14 is supported for reciprocating movement, and when applied to a wagon body, the arm 15 is beneath the bottom 52 of the wagon body, as shown in the drawing, and its inner end is secured to a retractile spring 25, which is secured at its opposite end to an eye 26, or other device. The upper arm 17 of the frame 14 extends inwardly through a hole 27 in the side 28 of the wagon body or frame, and the bar 10 therefore ranges within the wagon parallel with a side 28 thereof, so that an ice cake may be received between said bar and the side of the wagon.

The toothed bar 11 is exterior to the side 28 of the wagon or frame, and the teeth or picks 13 are adapted to be projected through holes 29. The bar is backed by any suitable operating device or devices, there being provided in the present instance a lever 30 which is fulcrumed at any convenient point, as on a bracket 31, said lever being supported against the vertical bar 16 of the frame 14. Pairs of spaced guide brackets 32 are secured to the outer side of the wagon body or frame, between which brackets the outer toothed bar 11 has guided movement.

With the described construction, an inward rocking of the lever 30 projects the teeth 13 of the outer bar against the outer side of the ice cake, while an outward movement of the lever will cause said lever to bear against the vertical bar 16 of the frame 14 and draw said frame outward, and with it the inner toothed bar 10. The said bar 10 is preferably employed essentially as a marking bar to mark the cake of ice, while the teeth 13 of the outer bar are preferably made longer and are employed to do the major portion of the work of splitting the cake. In practice, any suitable gage or graduations on the side of the wagon or frame will guide an inexperienced workman in breaking off a piece of ice of the required size. The teeth 12 are preferably carried on a base plate $12^a$, and the teeth are preferably threaded into said plate, so that if a tooth breaks it may be readily renewed by removing the plate $12^a$, for which purpose said plate is desirably secured by bolts 40 and wing nuts 41, or the like. Similarly, the teeth 13 are formed on a plate 13ª, which is secured by bolts 42 and wing nuts 43.

The hinging of the guide arm 22 permits it to be lowered against the side of the wagon when the toothed bars are removed, as when not desired for use, and the hinging of the member 18 of the arm 17 similarly permits said section to be raised. The bar 10 may be removed by withdrawing cotter pins 10ᶜ.

The bottom arm 15 of the frame 14 is provided with ratchet teeth 44ª, any one of which is adapted to be engaged by a spring-acted dog 44 that is mounted to slide in keepers 45, 45ª, for holding the frame 14 in the outer position. A guide keeper 46 may be provided for the bottom arm 15.

In connection with the described ice breaker, a guide is advantageously employed on the bottom of the wagon or other frame, to guide the cake of ice between the vertical bar 10 and the opposed side 28 of the wagon. Thus on the bottom of the wagon I have shown a guide block 48, the forward end of which tapers on a curved line in a direction away from the side 28, said block being disposed lengthwise of the wagon adjacent to the lower portion of the bar 10.

Having thus described my invention, I claim as new and desire to secure by Letters Patent:

1. An ice breaker, comprising a frame mounted to reciprocate, a toothed bar carried by said frame to move therewith, a second toothed bar movable independent of the frame, and means operable to actuate said frame or said second bar.

2. An ice breaker, comprising a frame having top and bottom arms and a side bar joining said arms, one of the arms having a hinged section, means for mounting said frame, a toothed bar carried by said arms, and means for reciprocating the frame and its toothed bar.

3. An ice breaker, comprising a frame having top and bottom arms and a side bar joining said arms, a toothed bar mounted in said frame, a second toothed bar having its teeth disposed oppositely to that of the first bar, means for mounting and operating said frame and second bar, and an additional guide arm for supporting one end of the toothed bars carried by the frame.

4. An ice breaker, comprising a spring-acted reciprocating frame, a toothed bar carried by the said frame, a hinged guide arm in which said bar has guided movement at one end, a lever movable against said frame to reciprocate it, a second toothed bar mounted independently of the frame and movable by said lever, and guide devices for said second toothed bar.

In testimony whereof, I have signed my name to this specification, in the presence of two subscribing witnesses.

JAMES LUTHER OPP.

Witnesses:
MARTIN MAYER,
J. J. BISCHOF.

---

Copies of this patent may be obtained for five cents each, by addressing the "Commissioner of Patents, Washington, D. C."